United States Patent
Ebel et al.

(10) Patent No.: US 9,608,856 B2
(45) Date of Patent: Mar. 28, 2017

(54) SYSTEM, METHOD, AND COMPUTER PROGRAM PRODUCT FOR IDENTIFICATION AND HANDLING OF A FLOOD OF ALARMS IN A TELECOMMUNICATIONS SYSTEM

(71) Applicant: TEOCO LTD., Rosh Ha'ayin (IL)

(72) Inventors: Shachar Ebel, Mevaseret Zion (IL); Yoav Sapir, Rehovot (IL)

(73) Assignee: TEOCO LTD., Afek Park, Rosh Ha'ayin (IL)

( * ) Notice: Subject to any disclaimer, the term of this patent is extended or adjusted under 35 U.S.C. 154(b) by 80 days.

(21) Appl. No.: 14/531,946

(22) Filed: Nov. 3, 2014

(65) Prior Publication Data

US 2015/0123784 A1     May 7, 2015

Related U.S. Application Data

(60) Provisional application No. 61/899,227, filed on Nov. 3, 2013.

(51) Int. Cl.
  *G08B 23/00*   (2006.01)
  *H04L 12/24*   (2006.01)
  *G06F 11/00*   (2006.01)

(52) U.S. Cl.
  CPC ........ *H04L 41/0604* (2013.01); *H04L 41/044* (2013.01); *H04L 41/0627* (2013.01)

(58) Field of Classification Search
  CPC  H04L 41/0604; H04L 41/044; H04L 41/0627
  USPC .......................................................... 340/517
  See application file for complete search history.

(56) References Cited

U.S. PATENT DOCUMENTS

| | | | |
|---|---|---|---|
| 6,694,364 B1 | 2/2004 | Du et al. |
| 6,748,432 B1 | 6/2004 | Du et al. |
| 7,100,095 B2 | 8/2006 | Godse et al. |
| 7,631,058 B2 | 12/2009 | Grabarnik et al. |
| 7,681,068 B2 | 3/2010 | Liss et al. |
| 7,792,036 B2 | 9/2010 | Clemm et al. |
| 7,796,500 B1 | 9/2010 | Elliott et al. |
| 8,041,799 B1 | 10/2011 | Usery et al. |
| 8,145,742 B1 | 3/2012 | Parker et al. |
| 8,219,663 B2 | 7/2012 | Faraldo |
| 8,230,445 B2 | 7/2012 | Hope et al. |

(Continued)

*Primary Examiner* — Jack K Wang
(74) *Attorney, Agent, or Firm* — ATFirm PLLC; Ralph P. Albrecht

(57) ABSTRACT

A system and method for identification and handling of a flood of alarms in a telecommunications system. A flood event occurs when a plurality of alarms in a queue of an alarm management system exceeds a threshold. The threshold may be a static, dynamic or adaptive threshold. A classification is determined for each flood event and preventive measures are determined. A plurality of floods having identical or different classifications may be identified respective of the plurality of alarms. A classification may be related, for example, to a network element (NE), element manager (EM), sync event, user actions, external application or rules. Preventive measures may be, for example, resetting a NE or EM or diverting alarms from the queue into another memory portion. The threshold may be determined respective of the total number of alarms in queue, the rate of alarms received and the rate of processing the alarms.

23 Claims, 4 Drawing Sheets

(56) References Cited

U.S. PATENT DOCUMENTS

| | | | |
|---|---|---|---|
| 8,344,852 B2 | 1/2013 | Roth | |
| 8,509,093 B2 | 8/2013 | Russell et al. | |
| 2001/0052006 A1* | 12/2001 | Barker | H04L 41/0213 709/223 |
| 2009/0089359 A1* | 4/2009 | Siorek | G05B 19/4186 709/202 |
| 2011/0004446 A1* | 1/2011 | Dorn | G01D 4/002 702/188 |
| 2013/0166745 A1* | 6/2013 | Dinger | H04L 41/069 709/224 |

* cited by examiner

SYSTEM, METHOD, AND COMPUTER PROGRAM PRODUCT FOR IDENTIFICATION AND HANDLING OF A FLOOD OF ALARMS IN A TELECOMMUNICATIONS SYSTEM

CROSS REFERENCE TO RELATED APPLICATIONS

The present disclosure is a US NonProvisional patent application, which claims the benefit under 35 U.S.C. Section 119(e) of U.S. Provisional Patent Application No. 61/899,227, Conf. No. 4770, filed Nov. 3, 2013, entitled, "A Method for Identification and Handling of a Flood of Alarms in a Telecommunications System," the contents of which is incorporated herein by reference in its entirety.

BACKGROUND

Field of the Disclosure

The present disclosure relates generally to management of alarms in a telecommunications system, and more particularly to management of a flood of alarms in such systems.

Related Art

Telecommunications systems generally have a large number of elements which together create a network infrastructure, such as a cellular network infrastructure. Network elements may be physical elements such as antennas, base stations, servers and the like, or software elements, where instructions are executed on one or more processing units. Network elements (NEs) and Element managers (EMs) are typically monitored and generate alarms during such monitoring to a network management system (NMS).

Reports may include events or alarms which the NEs or EMs send to the NMS. A flood of events/alarms occurs when a large amount of events or alarms are generated by one or more NEs or EMs, exceeding the NMS's handling capacity. The NMS may be impacted in such a way as to cause a delay in processing in a certain area in the system, leading to system resources (e.g., memory, disk space) exhaustion and eventually to a system partial or full crash. Alternatively, such a flood can lead to loss of tracking of events and alarms. Most floods have an additional dimension, which may be repeated events or toggling events. Repeated event floods occur when the same event is repeated at a high rate, being reported by one or more elements of the system. Toggling event floods occur when alternating events (such as indicating a system is offline then indicating a system is online and vice versa) are repeated at a high rate and reported by one or more elements of the system.

It would therefore be advantageous to provide a solution that overcomes the deficiencies of conventional solutions, by appropriate handling of flood situations that could prevent or at least reduce the risk of partial or full system crash.

SUMMARY

The disclosure sets forth systems, methods and computer program products relating to identification and handling of floods of alarms in telecommunications systems.

Accordingly, various example embodiments of the present disclosure are directed to a system, method and/or a computer program product including a computerized method for identification and handling of a flood of alarms, the method can include: receiving through a telecommunication network at least an alarm; storing the at least an alarm in a memory, the memory configured to handle a plurality of alarms or a group of related alarms; identifying at least a flood event respective of the at least an alarm; determining for each at least a flood event a classification; and determining at least a preventive measure respective of the classification of the at least a flood event.

In one exemplary embodiment, the method can include where the identifying at least a flood event can include: determining a first rate respective of receiving the plurality of alarms; and determining a second rate respective of time for alarm processing, wherein the first rate is greater than the second rate.

In one exemplary embodiment, the method can include where the identifying at least a flood event can include at least one of: determining a total number of alarms in the memory; determining a delay in processing alarms; or determining an input rate of alarms.

In one exemplary embodiment, the method can further include identifying a flood event end respective of the at least a flood event; and determining recovery actions respective of the classification of the at least a flood event.

In one exemplary embodiment, the method can include where the identifying a flood event end can include: determining a first rate respective of receiving the plurality of alarms; determining a second rate respective of time for alarm processing, wherein the first rate is lesser than the second rate; and determining the total number of alarms.

In one exemplary embodiment, the method can include where the at least a preventive measure can include: diverting alarms from the queue into another memory portion.

In one exemplary embodiment, the method can include where the received at least an alarm is respective of: a physical element, a logical element, or a combination thereof.

In one exemplary embodiment, the method can include where the physical element is any of: a network element (NE), an element manager (EM), a sub-element, a port, or a physical link.

In one exemplary embodiment, the method can include where the logical element is any of: an interface, a logical link, an application, or a logical module.

In another exemplary embodiment, system for identification and handling of a flood of alarms can include: a processing unit; a network interface communicatively coupled to the processing unit; a memory communicatively coupled to the processing unit, the memory containing instructions that when executed by the processing unit configure the system to: receive through a telecommunication network at least an alarm; store the at least an alarm in a memory, the memory configured to handle a plurality of alarms of a group of related alarms; identify at least a flood event respective of the at least an alarm; determine for each at least a flood event a classification; and determine at least a preventive measure respective of the classification of the at least a flood event.

In one exemplary embodiment, the system can further include containing instructions that when executed by the processing unit configure the system to: determine a first rate respective of receiving the plurality of alarms; determine a second rate respective of time for alarm processing, wherein the first rate is greater than the second rate; and determine the total number of alarms.

In one exemplary embodiment, the system can further include containing instructions that when executed by the processing unit configure the system to: identify a flood event end respective of the at least a flood event; and determine recovery actions respective of the classification of the at least a flood event.

In one exemplary embodiment, the system can further include containing instructions that when executed by the processing unit configure the system to: determine a first rate respective of receiving the plurality of alarms; determine a second rate respective of time for alarm processing, wherein the first rate is lesser than the second rate; and determine the total number of alarms.

In one exemplary embodiment, the system can include where the received at least an alarm is respective of: a physical element, a logical element, or a combination thereof.

In one exemplary embodiment, the system can include where the physical element is any of: a network element (NE), or an element manager (EM), a sub-element, a port, or a physical link.

In one exemplary embodiment, the system can include where the logical element is any of: an interface, a logical link, an application, or a logical module.

In yet another exemplary embodiment, a nontransitory computer program product embodied on a computer accessible medium can include program logic, which when executed on at least one processor performs a computerized method for identification and handling of a flood of alarms, the method can include: receiving through a telecommunication network at least an alarm; storing the at least an alarm in a memory, the memory configured to handle a plurality of alarms or a group of related alarms; identifying at least a flood event respective of the at least an alarm; determining for each at least a flood event a classification; and determining at least a preventive measure respective of the classification of the at least a flood event.

In one exemplary embodiment, the computer program product can include where the method can include where the identifying at least a flood event can include: determining a first rate respective of receiving the plurality of alarms; and determining a second rate respective of time for alarm processing, wherein the first rate is greater than the second rate.

In one exemplary embodiment, the computer program product can include where the method can include where the identifying at least a flood event can include at least one of: determining a total number of alarms in the memory; determining a delay in processing alarms; or determining an input rate of alarms.

In one exemplary embodiment, the computer program product can include where the method can include where the method further can include: identifying a flood event end respective of the at least a flood event; and determining recovery actions respective of the classification of the at least a flood event.

In one exemplary embodiment, the computer program product can include where the method can include where the identifying a flood event end can include: determining a first rate respective of receiving the plurality of alarms; determining a second rate respective of time for alarm processing, wherein the first rate is lesser than the second rate; and determining the total number of alarms.

In one exemplary embodiment, the computer program product can include where the method can include where the at least a preventive measure can include: diverting alarms from the queue into another memory portion.

In one exemplary embodiment, the computer program product can include where the method can include where the received at least an alarm is respective of: a physical element, a logical element, or a combination thereof.

In one exemplary embodiment, the computer program product can include where the method can include where the physical element is any of: a network element (NE), an element manager (EM), a sub-element, a port, or a physical link.

In one exemplary embodiment, the computer program product can include where the method can include where the logical element is any of: an interface, a logical link, an application, or a logical module.

BRIEF DESCRIPTION OF THE DRAWINGS

The subject matter herein is particularly pointed out and distinctly claimed in the claims at the conclusion of the specification. The foregoing and other objects, features and advantages of the disclosure will be apparent from the following detailed description taken in conjunction with the accompanying drawings.

The accompanying drawings, which are included to provide a further understanding and are incorporated in and constitute a part of this specification, illustrate exemplary, and nonlimiting embodiments and together with the description serve to explain the principles disclosed herein. In the drawings, like reference numbers may indicate substantially similar, equivalent, or exemplary elements, and the left most digits in the corresponding reference number indicate the drawing in which an element first appears.

DETAILED DESCRIPTION OF VARIOUS EXEMPLARY EMBODIMENTS

Figure 1:
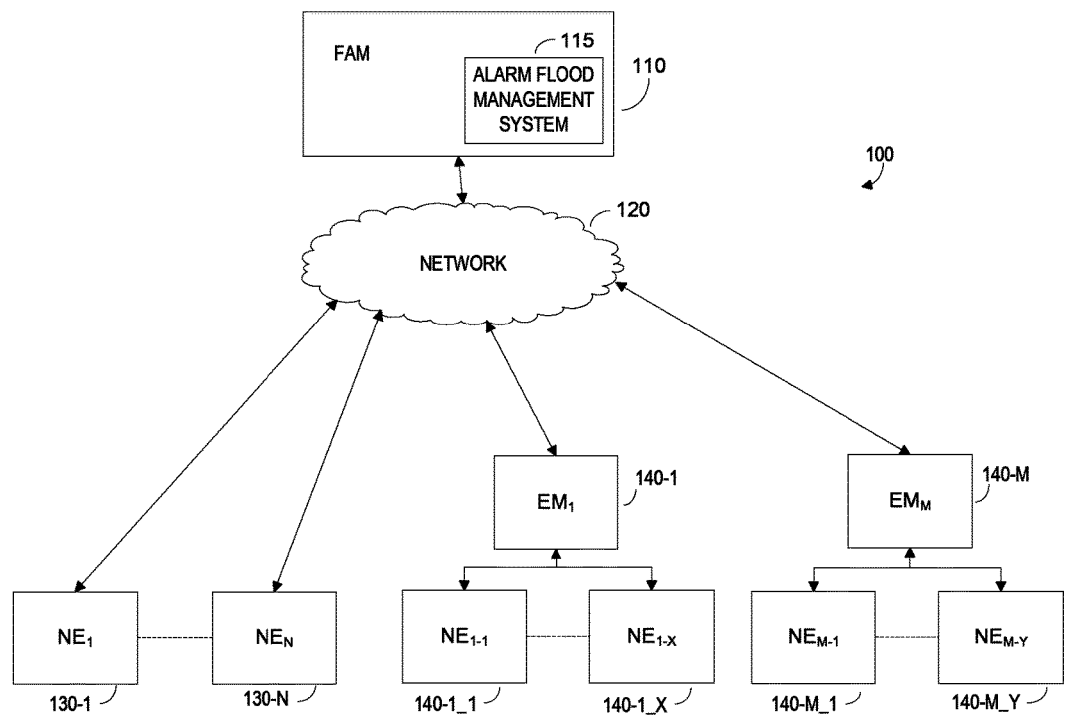
FIG. 1—is a schematic illustration of a flood management system implemented in a Fault Management System communicatively coupled with a telecommunication network.

It is important to note that the illustrative embodiments disclosed are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like reference numerals may refer to like parts through several views.

Reference will now be made in detail to various exemplary embodiments, examples of which are illustrated in the accompanying drawings. While specific exemplary embodiments are discussed, it should be understood that this is done for illustration purposes only. A person skilled in the relevant art will recognize that other components and configurations may be used without parting from the spirit and scope of the disclosure.

A system and method for identification and handling of a flood of alarms in a telecommunications system, is disclosed. A flood event can occur when a plurality of alarms in a queue of an alarm management system exceeds a threshold, in an illustrative embodiment. The threshold may be a static, dynamic or adaptive threshold, in one embodiment. A classification can be determined for each flood event and preventive measures can be determined, in one embodiment. A plurality of floods having identical or different classifications may be identified respective of the plurality of alarms, in one embodiment. A classification may be related, for example, but not limited to, to a network element (NE), element manager (EM), sync event, user actions, external application or rules, according to an illustrative embodiment. Preventive measures may include, for example, but are not limited to, resetting a NE or EM or diverting alarms from the queue into another memory portion, in one embodiment. The threshold may be determined dependent on the total number of alarms in queue, the rate of alarms received, and the rate of processing the alarms, in an exemplary embodiment.

FIG. 1 is an exemplary and non-limiting schematic illustration of an example alarm flood management system 115 implemented in a fault management (FaM) system 110 communicatively coupled with a telecommunications network 100. FaM 110 is communicatively coupled with Network Elements (NEs) and Element Managers (EMs) through network 120, in one embodiment. The network 120 can be configured to provide connectivity of various sorts, as may be necessary, including, e.g., but not limited to, wired and/or wireless connectivity, including, for example, but not limited to, local area network (LAN), wide area network (WAN), metro area network (MAN), worldwide web (WWW), Internet, etc., and/or any combination thereof, as well as cellular connectivity. Network 120 is further communicatively coupled, in an illustrative embodiment, with $NE_1$ 130-1 through $NE_N$ 130-N, generally referenced collectively as NEs 130 and $EM_1$ 140-1 through $EM_M$ 140-M, generally referenced collectively as EMs 140. EMs 140 each manage a plurality of NEs, such that $EM_1$ manages $NE_{1-1}$ 140-1_1 through $NE_{1-X}$ 140-1_X and $EM_M$ manages $NE_{M-1}$ 140-M_1 through $NE_{M-Y}$ 140-M_Y. Alarm flood management system 115 can receive through network 120 alarms relating to all NEs and EMs communicatively coupled therewith. The alarm flood management system 115 can be configured, in an illustrated embodiment, to execute methods described herein with respect of FIGS. 3-5. It should be noted that 'N', 'M', 'Y' and 'X', are integers having a value of '1' or greater.

Figure 2:
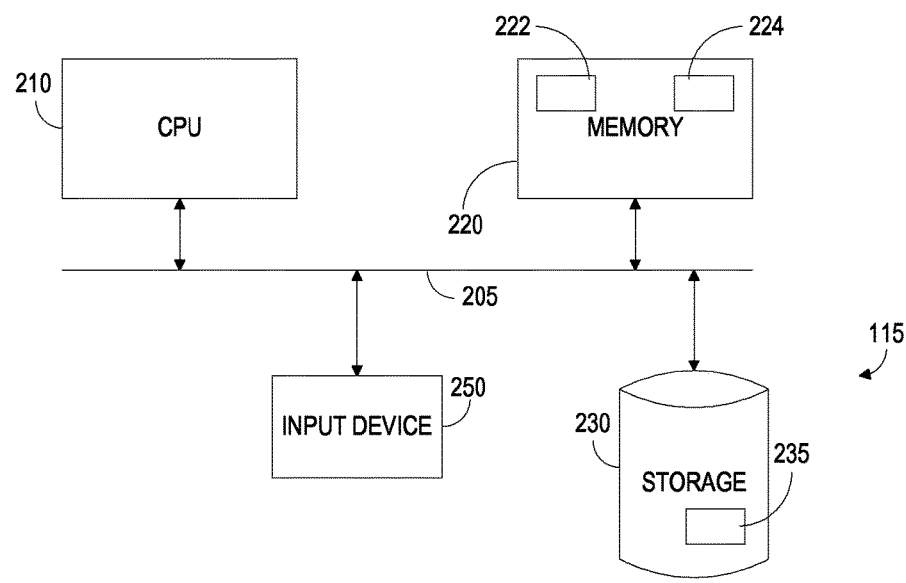
FIG. 2—is a schematic illustration of a flood management system implemented according to an illustrative embodiment.

FIG. 2 is an exemplary and non-limiting schematic illustration of an alarm flood management system 115 implemented according to an embodiment. The system 115 can include, in one embodiment, at least one processing element 210, for example, a central processing unit (CPU). The CPU can be coupled via a bus 205 to a memory 220, in one embodiment. The memory 220 can further include a memory portion 222 that can contain instructions that when executed by the processing element 210 can perform the method described in more detail herein. The memory 220 may be further used as a working scratch pad for the processing element 210, a temporary storage, and others, as the case may be. The memory 220 may include a volatile memory such as, e.g., but not limited to random access memory (RAM), or non-volatile memory (NVM), such as, e.g., but not limited to, Flash memory. Memory 220 may further include memory portion 224, which may contain information related to, alarms, such as, e.g., but not limited to, the order in which the alarms were received. The processing element 210 may be coupled to an input 250, in one embodiment. The processing element 210 may be further coupled with a storage 230. Storage 230 may be used for the purpose of holding a copy of the method executed in accordance with the disclosed technique, in one embodiment. Storage 230 may further comprise storage portion 235 containing a plurality of alarm flood classifications, in one embodiment. In an embodiment, the flood management system 115 can be configured to execute methods described herein with respect of FIGS. 3-5. These methods may be hardwired or, presented as a series of instructions to be executed by the processing element 210, in an illustrative embodiment.

Figure 3:
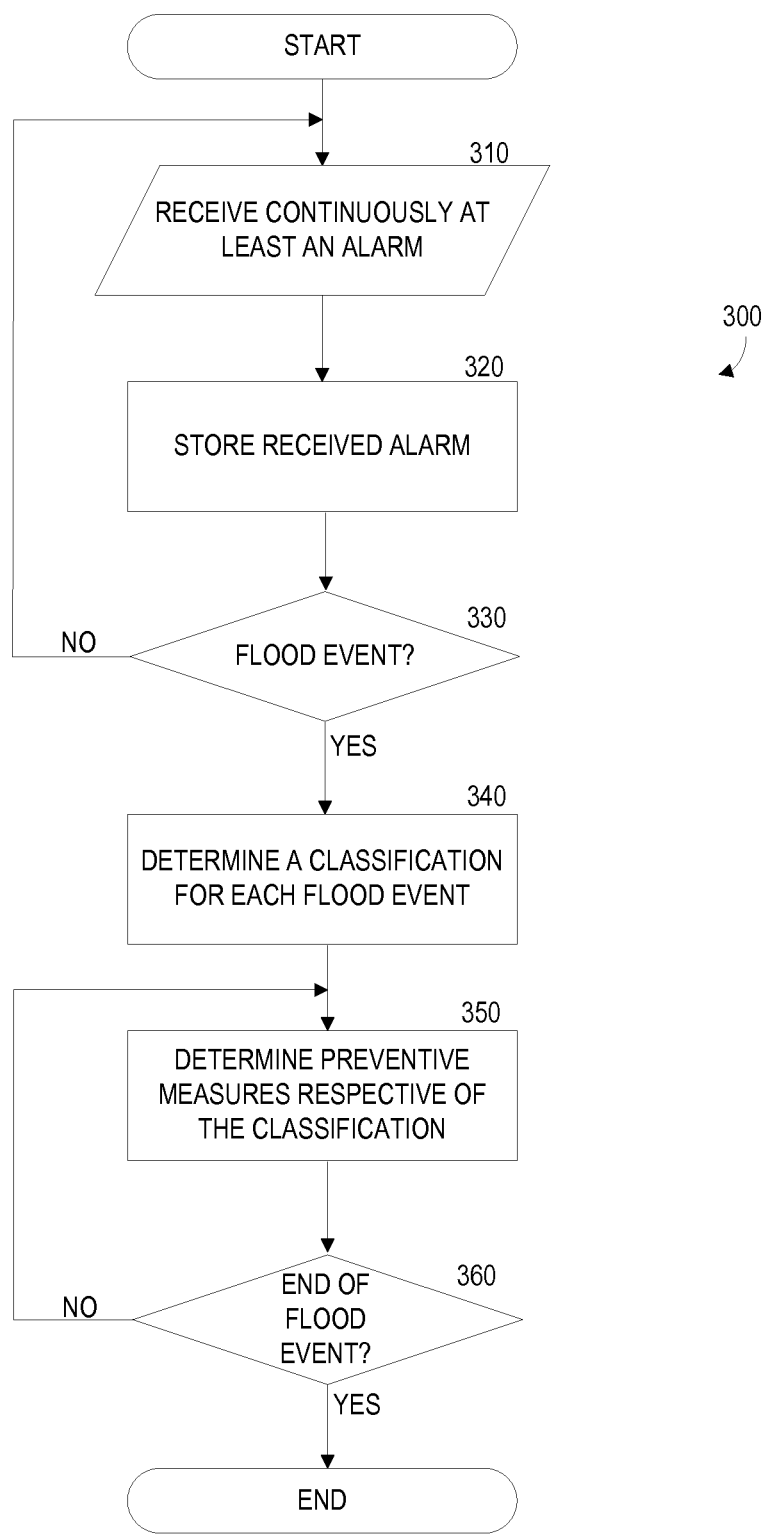
FIG. 3—is a flowchart of a method according to an illustrative embodiment.

FIG. 3 is a non-limiting exemplary flowchart 300 of a method according to an embodiment.

In 310 at least an alarm is received. Alarms can be received continuously. An alarm can include information respective of a fault and may further include a time stamp, an indicator of severity respective of the fault and the like, in an illustrative embodiment. An alarm may be respective of a physical element (such as, e.g., but not limited to, a network element (NE), element manager (EM), sub-element, a card or a port, etc.). An alarm may be respective of a logical entity (for example, but not limited to, an interface, a logical link, an application, or a logical module, etc.) or physical and logical links between elements.

In 320 the received at least one alarm is stored, for example in a memory 220. A plurality of alarms may be stored in the memory 220 to form at least one queue. It would be readily appreciated that alarms may be stored in other structures such as a list, buffer and the like without departing from the scope of this disclosure, according to example embodiments. A plurality of queues may be implemented to store related alarms, in one embodiment. A Fault Management (FaM) system, for example, FaM 115 may access the queue to process an alarm for determining appropriate responsive actions, in an illustrative embodiment.

In 330 a check can be performed respective of the received at least one alarm and respective of the plurality of stored alarms to determine if at least an alarm flood event is occurring. For example, a flood event can occur when the plurality of alarms in the queue exceeds a threshold. The threshold may be a static, dynamic or adaptive threshold, in example embodiments.

A static threshold can be a predetermined threshold that can remain constant, in one embodiment.

A dynamic threshold can be forcefully changed, for example, but not limited to, at a certain time of day, or a certain day of the year, etc., in one embodiment.

Adaptive thresholds can be changed in response to changes in characteristics of the network and may vary depending on a variety of parameters, in one embodiment. In another example, an alarm processing delay may be determined.

A time period for processing of a single alarm can be determined by measuring the time at which an alarm was received by the system and making a subsequent measurement of time when the alarm has been processed, in one embodiment. If the processing delay exceeds a threshold, a flood event is determined to occur, in an example embodiment.

In yet another example, the input rate of alarms may be determined by counting the number of alarms received within a time period. If the number of alarms exceeds a threshold, a flood event can be determined to occur.

In a further example, determining the total amount of alarms can be performed. If the total amount of alarms exceeds a threshold a flood event can be determined to occur.

If a flood event is not occurring, execution can continue at 310, otherwise execution can continue at 340, in an exemplary embodiment.

In 340 a classification can be determined for the at least a flood event.

In 350 preventive measures can be determined respective of the classification.

In 360 a check can be performed to determine if an end of flood event has occurred. If an end of flood event is occurring, execution can end, otherwise execution can continue at 350, where further preventive actions can be determined.

In certain embodiments, after determining the end of a flood event, the preventive actions can be stopped. The preventive actions may be stopped simultaneously, or gradually, in example embodiments. The preventive actions may be stopped in the order they were they were executed, in reverse order, according to a priority level, or combinations thereof, in various example embodiments.

A plurality of floods having identical or different classifications may be identified respective of the plurality of alarms, in one embodiment. A classification may be related, for example, but not limited to, to a NE, sync event, user actions, external application and/or rules, etc., according to example embodiments. A NE classification can include alarms respective of a single NE or EM, in one embodiment. A sync event classification can include a plurality of alarms received when the FaM, for example FaM 115, attempts to synchronize with one or more NEs or EMs, in an illustrative embodiment. As a result a plurality of alarms can be received, not all of which are currently relevant, in one embodiment. A rule induced flood can occur when rules cause elements within the system to generate or report an excessive amount of alarms. Preventive measures may include, for example, but are not limited to, resetting a NE or EM or diverting alarms from the queue. For example, alarms may be diverted from the queue and into another memory portion, in one embodiment. The amount of alarms diverted can be determined by the threshold. The threshold can be determined by the rate of alarms received and the rate of processing the alarms, in one embodiment. Diverting alarms ceases when the rate of alarms received is under the threshold, in one embodiment. In another example a preventive measure may be limiting the input rate of alarms in a configurable manner. The input rate may be limited by, for example, but not limited to, limiting the amount of alarms read from a network component. In another example, the input rate can be limited by storing alarms in a queue and releasing them to another queue or memory portion for later processing. Limitation in some examples can be performed by utilizing a static, dynamic or adaptive threshold. In other examples, it can possible to stop reception of: repeated alarms (i.e. alarms which repeat frequently) and toggling alarms (i.e. alarms which toggle events on/off). A preventive measure for a rule induced flood can include disabling rules causing the alarm flood. Selecting the rules to be disabled may be performed by determining rule processing time, rule priority or a combination thereof, in example embodiments.

Figure 4:
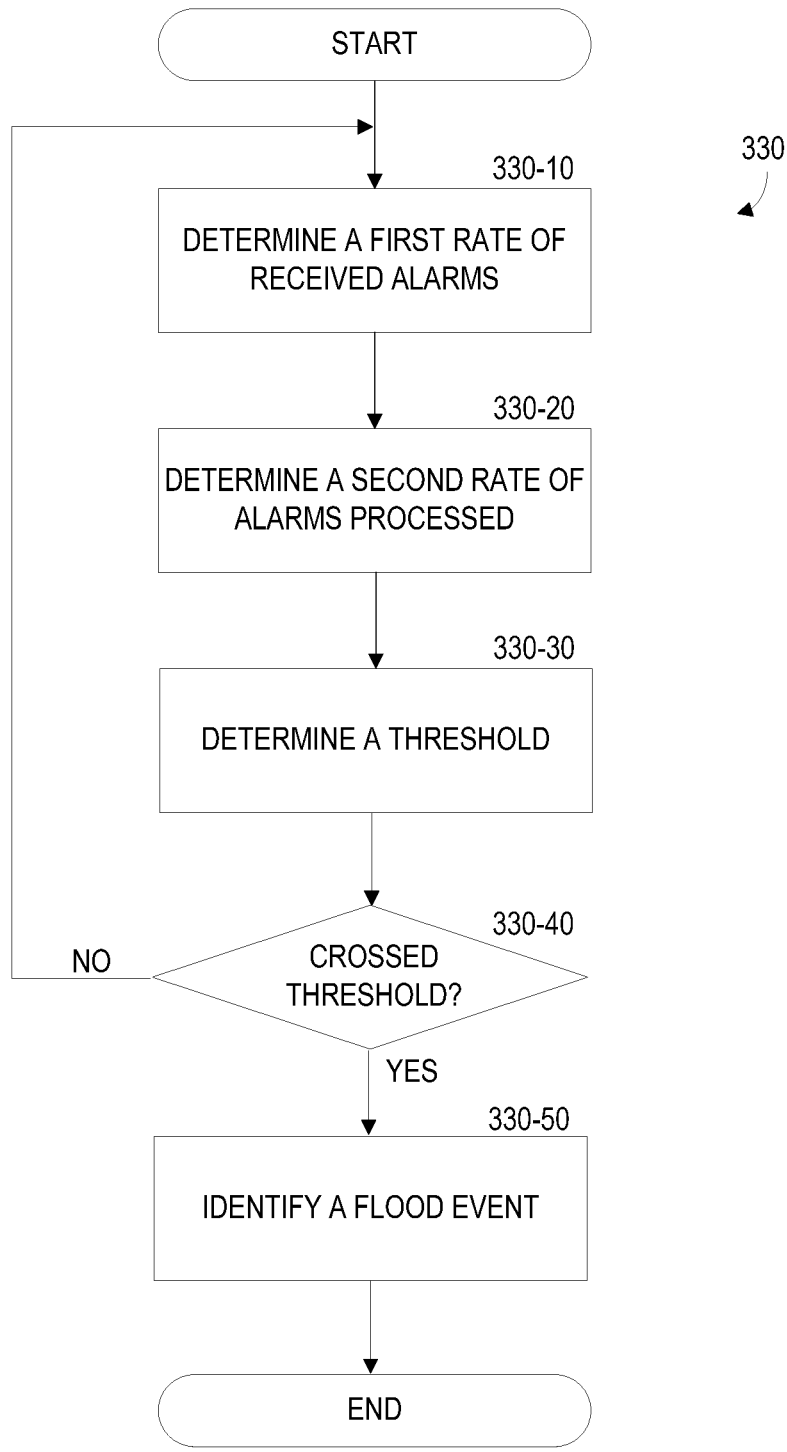
FIG. 4—is a flowchart of a method for determining occurrence of a flood event according to an illustrative embodiment.

FIG. 4 is a non-limiting exemplary flowchart 330 of a method for determining occurrence of an alarm flood event, according to an embodiment.

In 330-10 a rate at which alarms are received or stored can be determined, in one embodiment.

In 330-20 the rate of processing alarms can be determined, in one embodiment.

A threshold can be determined in 330-30, in one embodiment. In a non-limiting example, the threshold can be continuously determined respective of a FaM's rate of processing alarms, the rate at which alarms are received or stored and the total number of alarms.

In 330-40, in one embodiment, a check can be performed to determine whether the threshold was crossed. The threshold is crossed, for example, when the rate of alarms received is greater than the rate at which alarms are processed, in one embodiment.

If the threshold is crossed, execution can continue at 330-50, otherwise execution can continue at 330-10.

In 330-50, a flood event can be identified. A notification may be sent by the FaM, in one embodiment.

Figure 5:
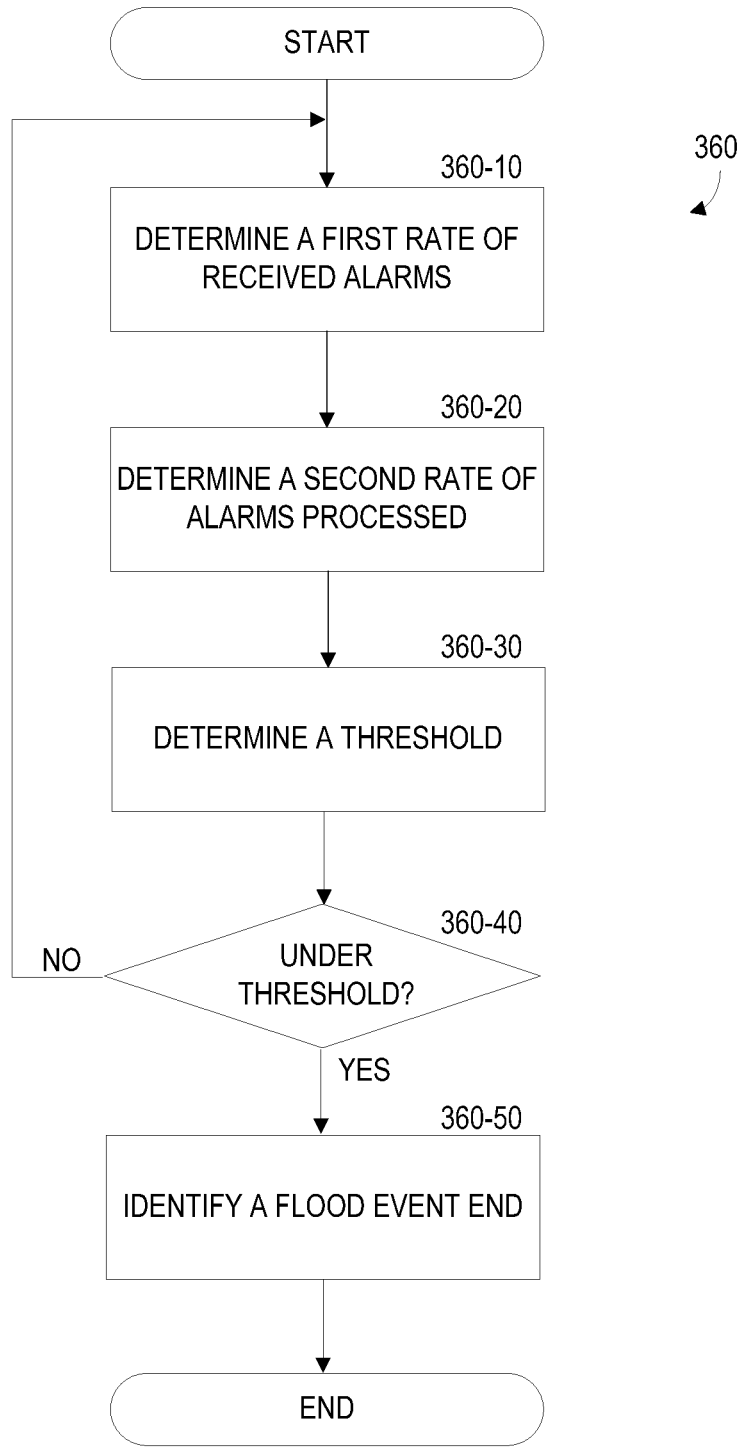
FIG. 5—is a flowchart of a method for determining occurrence of a flood event end according to an embodiment

FIG. 5 is a non-limiting exemplary flowchart 360 of a method for determining occurrence of a flood event end according to an embodiment.

In 360-10 a first rate at which alarms are received or stored can be determined, in one embodiment.

In 360-20 a second rate of processing alarms can be determined, in one embodiment.

A threshold can be determined in 360-30. In a non-limiting example, the threshold can be continuously determined respective of a FaM's rate of processing alarms, the rate at which alarms are received or stored and the total number of alarms, in one embodiment.

In 360-40 a check can be performed to determine whether the threshold was crossed, in one embodiment. The threshold can be crossed, for example, when the rate of alarms received is lesser than the rate at which alarms are processed, in one embodiment.

If the threshold is crossed, execution can continue at 360-50, otherwise execution can continue at 360-10.

In 360-50 a flood event end can be identified. A notification may be sent by the FaM.

The principles of this disclosure can be implemented as hardware, firmware, software, or any combination thereof. Moreover, the software can be preferably implemented as an application program tangibly embodied on a program storage unit or computer readable medium, in one example embodiment. The application program may be uploaded to, and executed by, a machine 115 comprising any suitable architecture, in one embodiment. Preferably, the machine 115 can be implemented on a computer platform having hardware such as a processing unit ("CPU") 210, a memory 220, and input/output interfaces, in one embodiment. The computer platform may also include an operating system and microinstruction code, in one embodiment. The various processes and functions described herein may be either part of the microinstruction code or part of the application program, or any combination thereof, which may be executed by a CPU, whether or not such computer or processor is explicitly shown, in example embodiments. In addition, various other peripheral units may be connected and/or coupled to the computer platform such as, e.g., but not limited to, an additional data storage unit and a printing unit and/or display unit, and/or removable storage and/or memory, etc.

References to "one embodiment," "an embodiment," "example embodiment," "various embodiments," "exemplary embodiment," "exemplary embodiments," etc., may indicate that the embodiment(s) so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct or indirect physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these nontransitory signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors. In one embodiment, a processor can include an ARM-processor based embedded or application processor device. In another embodiment, the computing platform can include a general purpose computing on graphics processing units (GPGPU) platform.

Embodiments may include apparatuses for performing the operations herein. An apparatus may be specially constructed for the desired purposes, or it may comprise a general purpose device selectively activated or reconfigured by a program stored in the device.

Computer programs (also called computer control logic), may include object oriented computer programs, and may be stored in memory 120, and/or secondary memory, such as, e.g., storage 130 and/or removable storage units (not shown), also called computer program products. Such computer programs, when executed, may enable the computer system 100 to perform the features as discussed herein. In particular, the computer programs, when executed, may enable the processor 110 to provide various functionality to the system 100 so as perform certain functions, according to an exemplary embodiment. Accordingly, such computer programs may represent controllers of the computer system 100.

In another exemplary embodiment, the methods may be directed to a computer program product comprising a computer readable medium having control logic (computer software) stored therein. The control logic, when executed by the processor 110, may cause the processor 110 to perform features as described herein. In another exemplary embodiment which may be implemented using software, the software may be stored in a computer program product and loaded into computer system 100 using, e.g., but not limited to, the storage 130, the removable storage drive, hard drive or communications interface (not shown), etc. The control logic (software), when executed by the processor 110, may cause the processor 110 to perform the functions as described herein. The computer software may run as a standalone software application program running atop an operating system, or may be integrated into the operating system, or may be executed as an applet, or via a browser and/or other process as is well known.

In yet another embodiment, implementation may be primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

The exemplary embodiments make reference to wired, or wireless networks. Wired networks can include any of a wide variety of well known means for coupling voice and data communications devices together. Similarly, any of various exemplary wireless network technologies may be used to implement the embodiments discussed.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents, as well as equivalents developed in the future, i.e., any elements developed that perform the same function, regardless of structure.

While various embodiments have been described above, it should be understood that they have been presented by way of example only, and not limitation. Thus, the breadth and scope of the disclosure should not be limited by any of the above-described exemplary embodiments, but should instead be defined only in accordance with the following claims and their equivalents. It will be apparent to those skilled in the art that various modifications and variations can be made without departing from the spirit or scope of the disclosure. Thus, it is intended that the disclosure cover the modifications and variations provided they come within the scope of the appended claims and their equivalents.

What is claimed is:

1. A computerized method for identification and handling of a flood of alarms, the method comprising:
   receiving, by at least one processor, through a telecommunication network at least an alarm;
   storing, by the at least one processor, the at least an alarm in a memory, the memory configured to handle a plurality of alarms or a group of related alarms;
   identifying, by the at least one processor, at least a flood event related to the at least an alarm, wherein said identifying said at least the flood event comprises:
   determining, by the at least one processor, a first rate of receiving, with respect to time, of the plurality of alarms; and
   determining, by the at least one processor, a dynamic second rate of alarm processing system capability with respect to time, wherein said dynamic second rate varies dynamically over time depending upon said alarm processing system capability at a given point in time,
wherein when the first rate is determined to be greater than the dynamic second rate at the given point in time, then said at least a flood event is identified;
determining, by the at least one processor, for each said at least a flood event a classification; and
determining, by the at least one processor, at least a preventive measure with respect to the classification of the at least a flood event.

2. The method of claim 1, wherein identifying at least a flood event comprises at least one of:
determining a total number of alarms in the memory;
determining a delay in processing alarms; or
determining an input rate of alarms.

3. The method of claim 1, further comprising:
identifying a flood event end respective of the at least a flood event; and
determining recovery actions respective of the classification of the at least a flood event.

4. The method of claim 3, wherein identifying a flood event end comprises:
determining a first rate respective of receiving the plurality of alarms;
determining a second rate respective of time for alarm processing, wherein the first rate is lesser than the second rate; and
determining the total number of alarms.

5. The computerized method of claim 1, wherein the at least a preventive measure comprises:
diverting alarms from the queue into another memory portion.

6. The computerized method of claim 1, wherein the received at least an alarm is respective of:
a physical element,
a logical element, or
a combination thereof.

7. The computerized method of claim 6, wherein the physical element is any of:
a network element (NE),
an element manager (EM),
a sub-element,
a port, or
a physical link.

8. The computerized method of claim 6, wherein the logical element is any of:
an interface,
a logical link,
an application, or
a logical module.

9. A system for identification and handling of a flood of alarms comprising:
a processing unit;
a network interface communicatively coupled to the processing unit;
a memory communicatively coupled to the processing unit, the memory containing instructions that when executed by the processing unit configure the system to:
receive through a telecommunication network at least an alarm;
store the at least an alarm in a memory, the memory configured to handle a plurality of alarms of a group of related alarms;
identify at least a flood event related to the at least an alarm,
wherein said identify at least the flood event comprises wherein the memory containing instructions that when executed by the processing unit configure the system to:
determine a first rate of receiving, with respect to time, of the plurality of alarms; and
determine a dynamic second rate of alarm processing system capability with respect to time,
wherein said dynamic second rate varies dynamically over time depending upon said alarm processing system capability at a given point in time,
wherein when the first rate is determined to be greater than the dynamic second rate at the given point in time, then said at least a flood event is identified;
determine for each said at least a flood event a classification; and
determine at least a preventive measure with respect to the classification of the at least a flood event.

10. The system of claim 9, further containing instructions that when executed by the processing unit configure the system to:
determine a first rate respective of receiving the plurality of alarms;
determine a second rate respective of time for alarm processing, wherein the first rate is greater than the second rate; and
determine the total number of alarms.

11. The system of claim 9, further containing instructions that when executed by the processing unit configure the system to:
identify a flood event end respective of the at least a flood event; and
determine recovery actions respective of the classification of the at least a flood event.

12. The system of claim 11, further containing instructions that when executed by the processing unit configure the system to:
determine a first rate respective of receiving the plurality of alarms;
determine a second rate respective of time for alarm processing,
wherein the first rate is lesser than the second rate; and
determine the total number of alarms.

13. The system of claim 9, wherein the received at least an alarm is respective of:
a physical element,
a logical element, or
a combination thereof.

14. The system of claim 9, wherein the physical element is any of:
a network element (NE), or
an element manager (EM),
a sub-element,
a port, or
a physical link.

15. The system of claim 13, wherein the logical element is any of:
an interface,
a logical link,
an application, or
a logical module.

16. A nontransitory computer program product embodied on a nontransitory computer accessible medium comprises program logic, which when executed on at least one processor performs a computerized method for identification and handling of a flood of alarms, the method comprising:

receiving through a telecommunication network at least an alarm;

storing the at least an alarm in a memory, the memory configured to handle a plurality of alarms or a group of related alarms;

identifying at least a flood event related to the at least an alarm, wherein said identifying said at least the flood event comprises:

determining a first rate respective of receiving, with respect to time, of the plurality of alarms; and determining a dynamic second rate of alarm processing system capability with respect to time, wherein said dynamic second rate varies dynamically over time depending upon said alarm processing system capability at a given point in time, wherein when the first rate is determined to be greater than the dynamic second rate at the given point in time, then said at least a flood event is identified;

determining for each said at least a flood event a classification; and determining at least a preventive measure with respect to the classification of the at least a flood event.

17. The computer program product of claim 16, wherein the identifying at least a flood event comprises at least one of:

determining a total number of alarms in the memory;

determining a delay in processing alarms; or determining an input rate of alarms.

18. The computer program product of claim 16, wherein the method further comprises:

identifying a flood event end respective of the at least a flood event; and determining recovery actions respective of the classification of the at least a flood event.

19. The computer program product of claim 18, wherein the identifying a flood event end comprises:

determining a first rate respective of receiving the plurality of alarms;

determining a second rate respective of time for alarm processing, wherein the first rate is lesser than the second rate; and determining the total number of alarms.

20. The computer program product of claim 16, wherein the at least a preventive measure comprises:

diverting alarms from the queue into another memory portion.

21. The computer program product of claim 16, wherein the received at least an alarm is respective of:

a physical element, a logical element, or a combination thereof.

22. The computer program product of claim 21, wherein the physical element is any of:

a network element (NE), an element manager (EM), a sub-element, a port, or a physical link.

23. The computer program product of claim 21, wherein the logical element is any of:

an interface, a logical link, an application, or a logical module.

* * * * *